Oct. 2, 1928.
D. E. STINSON
REFLECTOR
Filed March 23, 1926
1,686,476
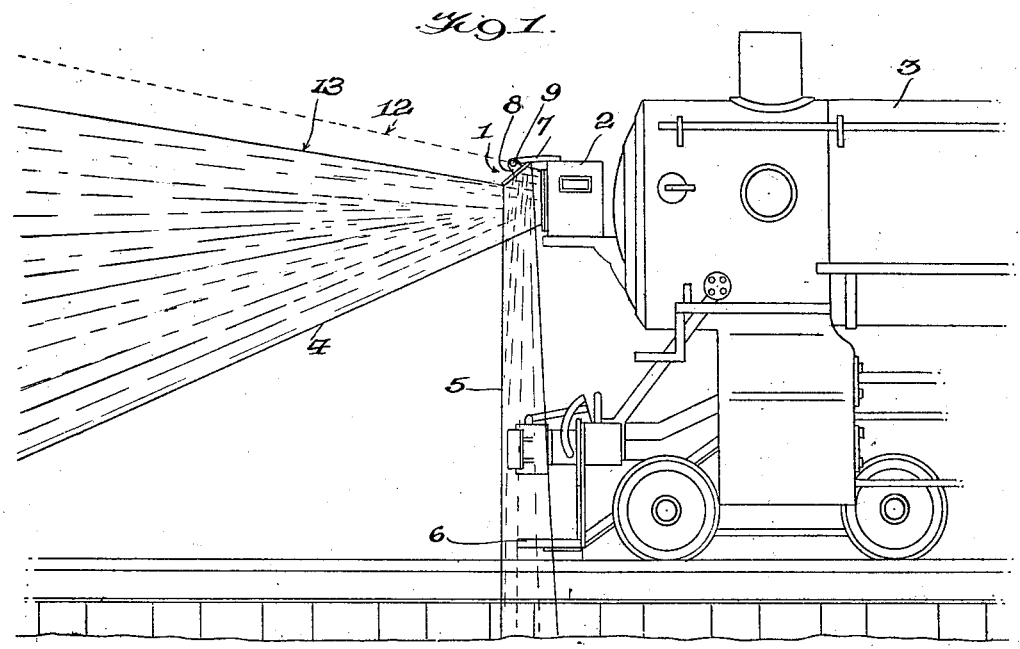
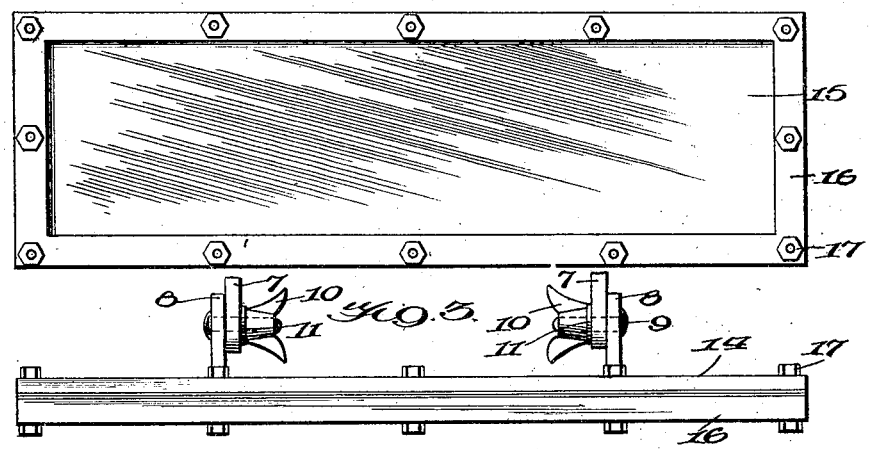
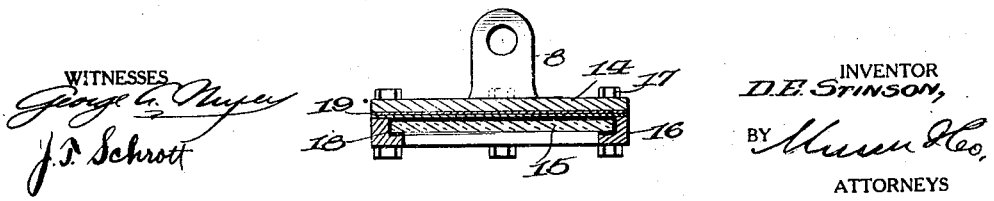
WITNESSES
INVENTOR
D. E. STINSON,
BY
ATTORNEYS Patented Oct. 2, 1928.

1,686,476

UNITED STATES PATENT OFFICE.

DAMON E. STINSON, OF PORTLAND, OREGON.

REFLECTOR.

Application filed March 23, 1926. Serial No. 96,797.

This invention relates to improvements in reflectors, and an object is to combine a mirror with a headlight in such position at the front of the headlight that a portion of the emerging light beam is reflected in a direction different from that of the beam.

Other objects and advantages appear in the following specification reference being had to the accompanying drawing in which Figure 1 is a side elevation of a portion of a locomotive and the headlight thereof illustrating the combination of a mirror with the headlight for the purpose of reflecting a portion of the light beam upon the foot-boards or steps.

Figure 2 is a front elevation of the mirror.

Figure 3 is a view of one of the longitudinal edges.

Figure 4 is a detail cross section.

As already stated in a general way, the purpose of the invention is to reflect a portion of the main light beam in a direction different from that of the main light beam and for a purpose subsidiary to that of said light beam. The specific application herein illustrated is that of the mirror generally designated 1 to the headlight 2 of a locomotive 3. The purpose of the mirror is to reflect a portion of the main light beam 4 in a direction different from that of said main beam, producing a subsidiary or supplemental light beam 5 for the purpose of illuminating the foot boards or steps 6 of the locomotive as well as a portion of the roadbed.

To the foregoing end the mirror 1 is placed in position in front of the headlight 2 so as to intercept but a small portion of the upper part of the light beam 4, and reflect that portion across the path of the main beam 4 in the downward direction. Supports 7 hold the mirror in the desired direction. These supports are mounted upon the headlight 2 in any conventional manner, and extend forwardly where attachment is made therewith of lugs 8 (Figs. 3 and 4) by any appropriate means as for example bolts 9, wing nuts 10 and split spring washers 11.

The arrangement 9, 10 and 11 provides a frictional mounting for the mirror upon the supports. The mirror can be adjusted to the required position and held there by tightening the thumb screws 10. It is necessary to adjust the mirror in order to regulate the direction of the supplemental beam 5, and some control of the direction of the beam 5 is had by moving the mirror 1 back and forth (within limits) upon its pivotal mountings.

In Figure 1 the disposition of the mirror 1 will probably be found exaggerated when compared with the actual position thereof in practice, but it shows the mirror adjusted at such an angle as to intercept the relatively small portion of the light beam 4, designated between the lines 12 and 13 and reflecting it in the downward direction. The headlight beam 4 spreads considerably as it emerges, and the upper portion of the beam strikes the surface of the mirror at quite a sharp angle of incidence. Inasmuch as the angle of reflection is the same as the angle of incidence it does not reqire a very pronounced slanting position of the mirror in respect to the headlight to produce the desired downward beam of light 5.

The mirror comprises a back 14 (Figs. 3 and 4) by which the lugs 8 are carried. The mirror 15 is a plane silvered glass held in place by a frame 16 and a suitable number of bolts and nuts 17, the former of which pass through both the frame and back to clamp the glass in position therebetween. A coating of waterproof cement 18 seals the edges of the glass, while a gasket 19 permits making a perfectly tight joint between the back and frame. The frame, it may be stated, is L or angle-shaped in cross section (Fig. 4). This produces a base which contacts the back 14 and a flange which bears upon the glass all around.

Need for a reflector of the character herein contemplated is felt by railroad workers who are engaged in the railroad yard at night. When a trainman or yardman finds it necessary to board a moving shifting engine at night, he must place himself practically in front of the oncoming engine. Great care must be exercised in stepping upon the footboards 6, and by virtue of the fact that the headlight beam 4 is intensely brilliant and spreads very widely, the trainman is often blinded so that he misses his footing and falls victim to an injury. Painting the footboards white as heretofore has been considerable help in increasing the visibility of the footboards, but it is a difficult matter to keep the white paint clean in a railroad yard so that the footboards soon revert to their original dangerous condition. By producing a supplemental light beam by use of the reflector or mirror 1 adequate illumination of the footboards is had so that no accidents can happen for want of sufficient lighting. The supplemental illumination requires no additional operating costs, the only cost being that of the mirror itself and the installation thereof.

While the construction and arrangement of the improved reflector is that of a preferred form, obviously modifications and changes may be made without departing from the spirit of the invention or the scope of the claim.

I claim:—

A reflector for illuminating the foot boards of a locomotive comprising a back having lugs, mounted upon a mirror, supporting means attached to the lugs and to a headlight to sustain the mirror in position to intercept and reflect a portion of the light beam, a frame surrounding the mirror and facing the back, means to clamp the back and frame together, and packing means interposed between the mirror, back and frame.

DAMON E. STINSON.